United States Patent [19]

Durvaux et al.

[11] Patent Number: 5,848,070
[45] Date of Patent: Dec. 8, 1998

[54] MULTIFRAME STRUCTURE AND HANDLING PROTOCOL FOR A TELECOMMUNICATION NETWORK

[75] Inventors: Marc Marie Gishlain Durvaux, Montigny-le Tilleul; Jean-Louis Bruno Fernand Bolsee, Liege, both of Belgium

[73] Assignee: Alcatel N.V., Rijswijk, Netherlands

[21] Appl. No.: 697,737

[22] Filed: Aug. 29, 1996

[30] Foreign Application Priority Data

Aug. 29, 1995 [EP] European Pat. Off. .............. 95202332

[51] Int. Cl.$^6$ ..................................................... H04J 3/12
[52] U.S. Cl. .......................... 370/442; 370/466; 370/472; 370/522
[58] Field of Search .................................... 370/347, 442, 370/487, 490, 522, 523, 524, 470, 472, 465–468, 458, 503, 509, 510, 486, 498, 537; 348/6–8, 12, 13; 455/3.1, 3.3, 4.1, 6.3

[56] References Cited

U.S. PATENT DOCUMENTS

| | | | |
|---|---|---|---|
| 4,656,629 | 4/1987 | Kondoh et al. ......................... | 370/522 |
| 5,189,673 | 2/1993 | Burton et al. ......................... | 370/110.1 |
| 5,208,807 | 5/1993 | Gass et al. .............................. | 370/60.1 |
| 5,323,383 | 6/1994 | Satoh ....................................... | 370/15 |
| 5,410,343 | 4/1995 | Coddington et al. ........................ | 348/7 |
| 5,499,241 | 3/1996 | Thompson et al. ...................... | 370/522 |
| 5,594,726 | 1/1997 | Thompson et al. ...................... | 370/524 |

FOREIGN PATENT DOCUMENTS

| | | |
|---|---|---|
| 0440059 | 8/1991 | European Pat. Off. . |
| 0462650 | 12/1991 | European Pat. Off. . |
| 0547527 | 6/1996 | European Pat. Off. . |

OTHER PUBLICATIONS

"Voice and Data Integration in the Air–Interface of a Microcellular Mobile Communication System", N. Mitrou et al, *IEEE Transactions on Vehicular Technology*, vol. 42, No. 1, Feb. 1993, New York, pp. 1–13.

Primary Examiner—Chau Nguyen
Attorney, Agent, or Firm—Ware, Fressola, Van Der Sluys & Adolphson LLP

[57] ABSTRACT

A multiframe structure is adapted to transmit narrowband telephony signals over a broadband cable link (BCL) carrying also video or television signals. The telephony transmission occurs according to classical telephony protocols such as the channel associated signalling (CAS) or the common channel signalling (CCS) protocols, which are mapped into the multiframe structure. The multiframe is transmitted according to the time division multiple access (TDMA) technique and each frame thereof has 40 time slots (TS00–TS39) carrying bursts of data. The frames include time slots carrying signalling bursts (S01–S30; S01–S04) of telephony signalling information and time slots carrying traffic bursts (D01–D30, C01–C36) of telephony traffic data. For the CCS, the time slots (TS00–TS03) carrying signalling bursts (S01–S04) are grouped within the frames so as to form a wideband common channel, whilst for the CAS, time slots (TS04, TS09, TS14, . . . , TS39) carrying signalling bursts are separated by four time slots carrying traffic bursts (D01–D30) and are distributed over all the frames of the multiframe structure on a periodic basis. The multiframe handling protocol is adapted to the above multiframe structure wherein at least one time slot (TS00–TS01; TS00–TS03) per frame carries a control burst of cable link operation signalling which is exchanged between a telephony access node (TAN) and subscriber stations (HOME) via the broadband cable link (BCL). The telephony access node (TAN) is adapted to load the address of a subscriber station into one of the time slots carrying control bursts and each subscriber station is adapted to recognize its own address in these time slots. When a subscriber station has recognized its own address in one of the time slots carrying control bursts, any kind of information may be exchanged between the telephony access node and the subscriber station through this one time slot.

41 Claims, 3 Drawing Sheets

FIG. 1

| TS | 00 | 01 | 02 | 03 | 04 | 05 | 06 | 07 | 08 | 09 | 10 | 11 | 12 | 13 | 14 | | 35 | 36 | 37 | 38 | 39 |
|---|---|---|---|---|---|---|---|---|---|---|---|---|---|---|---|---|---|---|---|---|---|
| FN00 | BSC | U64 | D01 | D02 | nu | D03 | D04 | D05 | D06 | S03 | D07 | D08 | D09 | D10 | S07 | | | | | | S27 |
| FN01 | U01 | U65 | D01 | D02 | nu | D03 | D04 | D05 | D06 | S04 | D07 | D08 | D09 | D10 | S08 | | D27 | D28 | D29 | D30 | S28 |
| FN02 | U02 | U66 | D01 | D02 | S01 | D03 | D04 | D05 | D06 | S05 | D07 | D08 | D09 | D10 | S09 | | D27 | D28 | D29 | D30 | S29 |
| FN03 | U03 | U67 | D01 | D02 | S02 | D03 | D04 | D05 | D06 | S06 | D07 | D08 | D09 | D10 | S10 | | D27 | D28 | D29 | D30 | S30 |
| FN04 | U04 | U68 | D01 | D02 | nu | D03 | D04 | D05 | D06 | S03 | D07 | D08 | D09 | D10 | S07 | | | | | | S27 |
| FN05 | U05 | U69 | D01 | D02 | nu | D03 | D04 | D05 | D06 | S04 | D07 | D08 | D09 | D10 | S08 | | D27 | D28 | D29 | D30 | S28 |
| FN06 | U06 | U70 | D01 | D02 | S01 | D03 | D04 | D05 | D06 | S05 | D07 | D08 | D09 | D10 | S09 | | D27 | D28 | D29 | D30 | S29 |
| FN07 | U07 | U71 | D01 | D02 | S02 | D03 | D04 | D05 | D06 | S06 | D07 | D08 | D09 | D10 | S10 | | D27 | D28 | D29 | D30 | S30 |
| | | | | | | | | | | | | | | | | | | | | | |
| FN60 | U60 | U124 | D01 | D02 | nu | D03 | D04 | D05 | D06 | S03 | D07 | D08 | D09 | D10 | S07 | | | | | | S27 |
| FN61 | U61 | U125 | D01 | D02 | nu | D03 | D04 | D05 | D06 | S04 | D07 | D08 | D09 | D10 | S08 | | D27 | D28 | D29 | D30 | S28 |
| FN62 | U62 | U126 | D01 | D02 | S01 | D03 | D04 | D05 | D06 | S05 | D07 | D08 | D09 | D10 | S09 | | D27 | D28 | D29 | D30 | S29 |
| FN63 | U63 | U127 | D01 | D02 | S02 | D03 | D04 | D05 | D06 | S06 | D07 | D08 | D09 | D10 | S10 | | D27 | D28 | D29 | D30 | S30 |

CAS

| TS | 00 | 01 | 02 | 03 | 04 | 05 | 06 | 07 | 08 | 09 | 10 | 11 | 12 | 13 | 14 | ... | 35 | 36 | 37 | 38 | 39 |
|---|---|---|---|---|---|---|---|---|---|---|---|---|---|---|---|---|---|---|---|---|---|
| FN00 | S01 | S02 | S03 | S04 | C01 | C02 | C03 | C04 | C05 | C06 | C07 | C08 | C09 | C10 | C11 | | | C33 | C34 | C35 | C36 |
| FN01 | S01 | S02 | S03 | S04 | C01 | C01 | C03 | C04 | C05 | C06 | C07 | C08 | C09 | C10 | C11 | | C32 | C33 | C34 | C35 | C36 |
| FN02 | S01 | S02 | S03 | S04 | C01 | C02 | C03 | C04 | C05 | C06 | C07 | C08 | C09 | C10 | C11 | | | C33 | C34 | C35 | C36 |
| FN03 | S01 | S02 | S03 | S04 | C01 | C01 | C03 | C04 | C05 | C06 | C07 | C08 | C09 | C10 | C11 | | C32 | C33 | C34 | C35 | C36 |
| FN04 | S01 | S02 | S03 | S04 | C01 | C02 | C03 | C04 | C05 | C06 | C07 | C08 | C09 | C10 | C11 | | | C33 | C34 | C35 | C36 |
| FN05 | S01 | S02 | S03 | S04 | C01 | C01 | C03 | C04 | C05 | C06 | C07 | C08 | C09 | C10 | C11 | | C32 | C33 | C34 | C35 | C36 |
| FN06 | S01 | S02 | S03 | S04 | C01 | C02 | C03 | C04 | C05 | C06 | C07 | C08 | C09 | C10 | C11 | | | C33 | C34 | C35 | C36 |
| FN07 | S01 | S02 | S03 | S04 | C01 | C01 | C03 | C04 | C05 | C06 | C07 | C08 | C09 | C10 | C11 | | C32 | C33 | C34 | C35 | C36 |
| ... | | | | | | | | | | | | | | | | | | | | | |
| FN60 | S01 | S02 | S03 | S04 | C01 | C02 | C03 | C04 | C05 | C06 | C07 | C08 | C09 | C10 | C11 | | | C33 | C34 | C35 | C36 |
| FN61 | S01 | S02 | S03 | S04 | C01 | C01 | C03 | C04 | C05 | C06 | C07 | C08 | C09 | C10 | C11 | | C32 | C33 | C34 | C35 | C36 |
| FN62 | S01 | S02 | S03 | S04 | C01 | C02 | C03 | C04 | C05 | C06 | C07 | C08 | C09 | C10 | C11 | | | C33 | C34 | C35 | C36 |
| FN63 | S01 | S02 | S03 | S04 | C01 | C01 | C03 | C04 | C05 | C06 | C07 | C08 | C09 | C10 | C11 | | C32 | C33 | C34 | C35 | C36 |

CCS

MULTIFRAME STRUCTURE AND HANDLING PROTOCOL FOR A TELECOMMUNICATION NETWORK

TECHNICAL FIELD

The present invention relates to a multiframe structure for transmitting narrowband telephony signals according to channel associated signalling protocols or common channel signalling protocols over a broadband cable link onto which broadband signals are transmitted.

BACKGROUND OF THE INVENTION

Today's CAble TeleVision (CATV) networks originally designed to transport broadband signals such as analog video or television signals over broadband cable links can be merged with telephony access networks in order to provide for an alternate solution to access subscriber stations with both the video and the telephony signals. The cable links of the networks may be optical-fiber or coaxial cables coupling a video broadcasting head-end as well as a telephony access node to several subscriber stations, generally via a central hub, each subscriber station being provided with a telephone and/or a television set.

Such a telecommunication network operating at a radio frequency has a bus connection topology and, for economic reasons, the Time Division Multiple Access (TDMA) is the preferred access technique. The uplink, i.e. the link from the subscriber stations to the broadcasting head-end, is a multipoint-to-point connection and a telephony receiver coupled to the central hub, and more particularly to the telephony access node associated thereto, needs to synchronize itself successively to telephony signals having a random phase and a frequency uncertainty. This synchronization process requires that a known pattern is transmitted by every emitter, i.e. subscriber station, at every transmission thereof. According to the information theory principles, such a pattern can not carry useful information. It thus appears as a burden on the efficiency of the transmission. In order to minimize this penalty, the transmitted telecommunication information bits are grouped in so-called "bursts" of data. A burst is roughly equivalent to the contents of a well-known time slot or "channel" of a Time Division Multiplex (TDM) frame. Such a time slot is adapted to carry any type of classical narrowband telephony data, but a burst additionally comprises extra bits for synchronization, error control, TDMA signalling and guard bits to avoid burst overlaps. This overhead may add significant bandwidth requirement because of the thereby increased length of the time slot.

Since the telephony receiver has only to be synchronized once per burst, the longer a burst, the better the channel usage and thus the transmission efficiency. On the other hand, the longer a burst, the larger the transmission delay due to the "packetization" of the data therein. It is however well known that a standard telephony access network requires a low loop delay and thus a relatively low number of bits per burst. In other words, relatively short time slots are required.

The known video transmission networks are thus a priori not adapted for transmitting telephony signals according to the Time Division Multiple Access (TDMA) technique over a bus connection topology with geographically distant access points.

Another constraint is that, to allow an efficient layered implementation, all the time slots should have a same length. The telephony receiver can then more easily extract the bursts of data from these time slots without having knowledge of their meaning.

In order to solve the above problems, solutions are currently implemented depending on the existing telephony transmission signalling protocols used. Two standard classes of telephony signalling protocols are considered here: the Channel Associated Signalling (CAS) and the Common Channel Signalling (CCS).

For the Channel Associated Signalling (CAS) protocols, the signalling information is carried along with the traffic data, i.e. the user telephony data. These older signalling schemes generally use a combination of in-band tones and line states to code signalling messages such as on and off hook, dial number, ringing, busy, . . . These signalling messages are carried by a particular time slot, called "signalling channel", of the frame and are always associated to user data carried by two other time slots, called "traffic channels", of the same frame. Several frames are therefore necessary to provide sufficient signalling channels for carrying the signalling messages of all the data channels of a frame.

When implemented in a TDMA technique, a straightforward and optimal approach is to add a few extra bits to each burst of traffic data, these extra bits corresponding to the signalling information that goes together with the traffic data. Each time slot should then be dedicated to a particular traffic channel with its associated signalling.

The limitation of this design is that it is impossible to exchange signalling information when no traffic channel is allocated. This could be the case in a concentrating interface, i.e. where more subscribers are connected to the network than the number of traffic channels.

The Common Channel Signalling (CCS) protocols are more recent and now widely used to carry signalling information between telecommunication exchanges, e.g. according to the CCITT 7 standard, or even in a telephony access network according to the well-known "Integrated Service Digital Network" (ISDN) or V5.x scheme. In the CCS protocols, the signalling channels are independent of the traffic channels. The issue related to the concentration in the access network can thus be solved.

The important point for a TDMA implementation of CCS protocols is thus that the signalling channel of a frame is no longer linked to a particular traffic channel of that frame, but is a channel on it own. However, the constraint on the burst size remains.

Today signalling protocols in a telephony access network are still mainly channel associated signalling (CAS) but there is a normal evolution towards common channel signalling (CCS). When designing a product, such as the present so-called "CablePhone", which has to fit within existing networks, it is necessary to cope with channel associated signalling while not blocking evolution towards common channel signalling. Furthermore, it has to be taken into account that the design of the multiframe structure, and the bursts associated therewith, has an impact on the frequency plan.

An implementation suited for CAS may not carry CCS because, in the latter, there is no direct relationship between signalling channels and traffic channels. Indeed, forcing to do so will result in a very inefficient spectrum usage of the telephony transmission frequency band because of the great number of unused bits.

Conversely, a frame structure adapted to CCS is inadequate to carry CAS since signalling channels should then be allocated independently to the traffic channels.

DISCLOSURE OF INVENTION

A first object of the present invention is to provide a multiframe structure that allows the support, on an existing broadband cable link, of at least the channel associated signalling (CAS) and the common channel signalling (CCS) protocols while avoiding significant efficiency loss in any of these signalling modes.

According to the present invention, this first object is achieved due to the fact that said multiframe structure includes a plurality of time division multiple access frames, each frame comprising a plurality of time slots each adapted to carry a burst of data, a first plurality of said time slots carrying signalling bursts of telephony signalling information and a second plurality of said time slots carrying traffic bursts of telephony traffic data, that for the common channel signalling protocols the time slots carrying said signalling bursts are grouped within each of said frames, and that for the channel associated signalling protocols time slots carrying said signalling bursts are separated by several time slots carrying said traffic bursts and are distributed over the frames of said multiframe structure on a periodic basis.

In this way, the above contradictory constraints of using a bus connection topology as for the video signals and of having a low loop delay as required by a standard telephony access network are solved by mapping differently the signalling bursts to respectively so-called "out-of-band CAS bursts" or group them to get a wideband common channel for CCS. Although distinct bursts are used for signalling and for traffic, the signalling bursts are associated to traffic bursts over the multiframe structure in case of CAS protocols, while the grouped signalling channels offer enough bandwidth to carry whole CCS protocols.

Another characteristic feature of the present invention is that each of said frames includes at least one time slot carrying a control burst of cable link operation signalling for exchange between a telephony access node and subscriber stations which are all coupled to said broadband cable link onto which said broadband signals are frequency multiplexed with said narrowband telephony signals.

This cable link operation signalling is for instance a user associated channel number transmitted by the telephony access node to address a particular subscriber station or broadcast synchronization signalling used to perform synchronization of the multiframe.

Owing to the frequency multiplexing, both the narrowband classical telephony signals and the video signals can be transmitted over the same broadband cable link to the subscriber stations and more particularly to a telephone and/or to a television set thereof respectively.

It is furthermore not excluded that some of the telephony signals are used to control, from the subscriber station, the transmission of the video signals thereto. These signals are then transmitted to the video broadcasting head-end either directly or via the telephony access network.

Still another characteristic feature of the present multiframe structure is that for said channel associated signalling the time slots of said multiframe structure are distributed in said multiframe structure at a rate of one time slot carrying a signalling burst for four time slots carrying traffic bursts.

Preferably, for said channel associated signalling each of said frames includes eight time slots carrying signalling bursts and at least thirty time slots carrying traffic bursts, each of said signalling bursts being associated to at most one of said traffic bursts.

Moreover, each of said frames comprises forty time slots and each of said bursts of data comprises a synchronization part and a payload, said synchronization part including guard bits, synchronization bits and error control bits and said payload including a plurality of bytes of said telephony signals.

In more detail, for any of the CAS or the CCS protocols, said payload consists of four bytes of said telephony signals and said multiframe structure includes at least four frames.

Whole CAS and CCS protocols can thereby be mapped in the present multiframe structure.

A second object of the present invention is to define a multiframe handling protocol for handling a multiframe structure used for transmitting narrowband telephony signals over a broadband cable link onto which said narrowband telephony signals are frequency multiplexed with broadband video signals.

Because a cable television network, to which the present invention relies, has a point-to-multipoint bus topology, an asymmetric handling protocol has to be defined for the telephony signals with contention management on the uplink path over the broadband cable link, i.e. from subscriber stations to a telephony access node. This multiframe handling protocol has to manage transparently different signalling schemes as for instance the channel associated signalling (CAS) and the common channel signalling (CCS). Furthermore, the bandwidth necessary to carry these protocols must be reduced because it is seen as an overhead for the transmission efficiency.

According to the present invention, this second object is achieved due to the fact that said multiframe structure includes a plurality of time division multiple access (TDMA) frames, each frame comprising a plurality of time slots adapted to carry telephony bursts of narrowband telephony data and at least one time slot adapted to carry a control burst of cable link operation signalling for exchange between termination devices located at each end of said broadband cable link.

In this way, the control bursts may be used to allocate and de-allocate traffic channels, i.e. time slots, to the telephony signals transmitted between the telephony access node and the subscriber stations, while the so-called "polling delay" is tuneable by allocating, per frame, one or more time slots carrying control bursts of cable link operation signalling. The bandwidth used by the present multiframe handling protocol may thus, if required, be reduced to a minimum. Moreover, since the multiframe handling protocol is independent of the other data carried by the multiframe structure, i.e. of the telephony service, this multiframe structure may transparently carry most any type of signalling schemes, including the above CAS and CCS protocols.

Another characteristic feature of the present multiframe handling protocol is that said broadband cable link couples a telephony access node to a plurality of subscriber stations, each of said subscriber stations having an unique address, that, at the location of said telephony access node, one unique address is loaded into one of said time slots carrying a control burst, that said one unique address is recognised by the subscriber station having said one unique address, and that only said one time slot is then used on said broadband cable link to carry control bursts of said cable link operation signalling exchanged between said telephony access node and said subscriber station having said one unique address.

Once a communication is established between the telephony access node and a subscriber station via a predetermined time slot carrying a control burst and defined by the telephony access node, the same predetermined time slot is further always used for the exchange of any data between the latter. It is thus possible, through the time slot carrying a control burst, to initiate and manage remote functions such as tests, configuration settings, status and alarm reporting, resets, etc . . .

Also another characteristic feature of the present multiframe handling protocol is that in said multiframe structure the number of time slots carrying control bursts is higher than the number of telephony communications simultaneously established over said broadband cable link between said telephony access node and said subscriber stations.

The number of telephony communications simultaneously possible over the broadband video cable link is dependent of the number of time slots, per frame, able to carry bursts of telephony data, while the number of links between the telephony access node and subscriber stations is dependent of the number of time slots carrying control bursts per multiframe. In the present multiframe structure it is thus possible to have more permanent links than simultaneous communications between the subscriber stations and the telephony access node.

The present invention is further also characterized by a telephone access node including line termination means adapted to operate the above multiframe structure and multiframe handling protocol and by a subscriber station including network termination means also adapted to operate such multiframe structures and multiframe handling protocols.

These and other objects, features and advantages of the present invention will become more apparent in light of the detailed description of a best mode embodiment thereof, as illustrated in the accompanying drawing.

Figure 1:
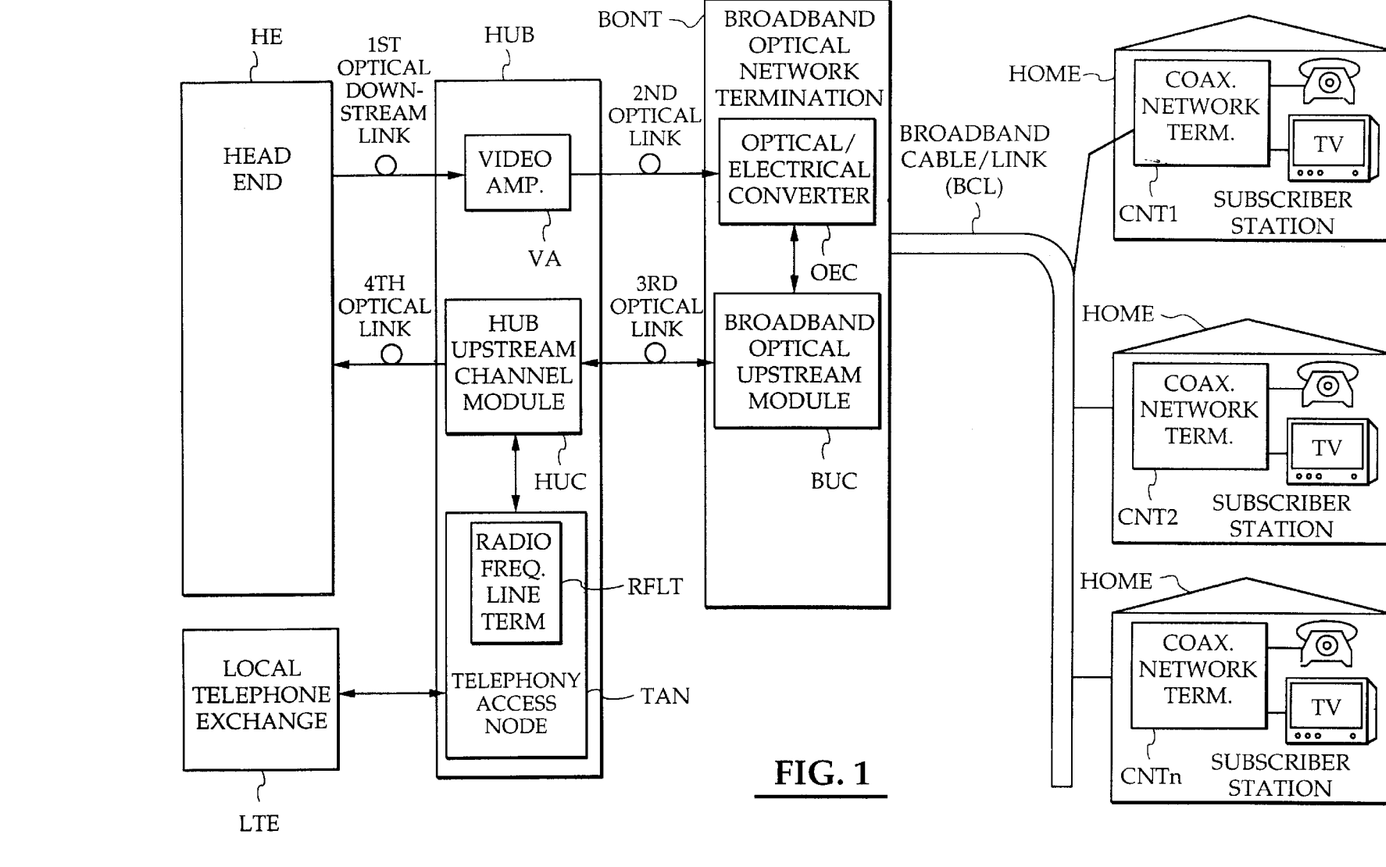
FIG. 1 shows a telecommunication network wherein telephony signals are transmitted over a multiframe structure and following a multiframe handling protocol according to the present invention.

The telecommunication network shown in FIG. 1 is a cable-phone network that includes a broadband CAble TeleVision (CATV) distribution network and a narrowband standard telecommunication network. On the one hand, broadband video or television signals are provided by a head-end HE and are broadcasted, via a central hub HUB, towards television sets located in subscriber stations at the premises of users. In FIG. 1, a television set is labelled as TV and a subscriber station is generally indicated by HOME. On the other hand, narrowband telephony signals are transmitted between a local telephone exchange LTE and telephone sets of the users also located in the subscriber stations HOME. As will be explained below, the video and the telephony signals are merged onto a broadband cable link BCL coupling the central hub HUB to all the subscriber stations HOME.

In more detail, the video signals of the video broadcasting head-end HE are first transmitted, via a first optical broadband down-stream link, to a video amplifier VA forming part of the central hub HUB. From the video amplifier VA the video signals are further transferred, via a second optical broadband down-stream link, to an optical/electrical converter OEC located in a broadband optical network termination BONT interfacing the central hub HUB and the subscriber stations HOME. In the converter OEC, the video signals are frequency multiplexed with the telephony signals and these merged signals are transmitted on the bi-directional coaxial broadband cable link BCL. The broadband cable link BCL has a bus topology to which the subscriber stations HOME are connected via respective coaxial network terminations CNT1, CNT2, . . . CNTn. A coaxial network termination, which will hereafter generally be referred to as CNT, forms part of the subscriber station HOME and is located in or near to the user premises. CNT is an interface between the coaxial broadband cable link BCL and the television set TV and/or the telephone set of the user. A CNT is thus adapted to separate the video signals and the telephony signals transmitted on the cable link BCL and to transmit them to the television set TV and to the telephone set of the user respectively, and vice versa.

Telephony signals are narrowband signals obviously transmitted in a bi-directional way over the cable link BCL that is also used as a broadband down- and upstream-link respectively for the broadband video signals and for possible control signals generated in the subscriber station HOME, e.g. to get other video sequences from the head-end HE. The telephony and control signals transmitted from CNT to the converter OEC, are further directed to a broadband optical upstream module BUC forming part of the broadband optical network termination BONT. From the BUC, these upstream signals are transmitted, via a third optical link, to a hub upstream channel module HUC forming part of the central hub HUB. The HUC is connected, via a fourth optical link, to the video broadcasting head-end HE. The HUC has another separate connection to a telephony access node TAN located in or near to the central hub HUB. From the hub upstream channel module HUC the control signals are transmitted to the video broadcasting head-end HE via the fourth optical link, while the telephony signals are transmitted, in a bi-directional way, to the telephony access node TAN and so further to the local telephone exchange LTE to which TAN is connected.

It is to be noted that the first and fourth optical links have a length of less than 20 km, that the second and third optical link have a length of less than 10 km, and that the coaxial broadband cable link BCL has a length of approximately 250 m.

In another implementation, either the telephony access node TAN or the local telephone exchange LTE may be connected to the video broadcasting head-end HE. The fourth optical link between the HUC and HE is then no longer necessary since the control signals may be transferred via TAN or LTE. In this case, the control signals should be sent as narrowband telephony signals or the TAN and/or the LTE should be adapted to transmit the broadband control signals.

Between the telephony access node TAN and the coaxial network termination CNT, the telephony signals are transmitted over the hybrid fiber/coax network according to a Time Division Multiple Access (TDMA) multiframe structure that will be explained below. To this end, the telephony access node TAN includes a radio frequency line termination RFLT which, as the coaxial network termination CNT located in each subscriber station HOME, is adapted to convert telephony signals transmitted according to standard telephony transmission protocols such as the Channel Associated Signalling (CAS) schemes or the Common Channel Signalling (CCS) schemes into signals able to be carried in bursts of the TDMA multiframe structure, and vice versa. The principles of these conversions will be described hereafter but not the circuits adapted to realize them because for a person skilled in the art they are relatively easy to implement according to the given description.

As well known in the art, a channel associated signalling (CAS) scheme is a standard telephony transmission protocol using a time division multiframe (TDM) structure. Each multiframe of the CAS protocol comprises 15 frames which are each constitutes of 32 time slots also called "channels". Each time slot is adapted to carry one byte of a telephony signal. In each frame, the first time slot contains synchronization information, the next 15 time slots carry telephony user data and are called "traffic channels". Then follows a time slot carrying telephony signalling information followed by 15 other traffic channels. The signalling information is constituted by so-called "out-of-band information" which is associated to two distinct traffic channels of the frame. In more detail, a first half byte of the signalling information carried by the so-called "signalling channel" is associated to a first traffic channel, while the second half byte of the same signalling channel is associated to another traffic channel of the frame. The signalling information relates for instance to the on/off hook status. Dialling, ringing and busy information of the telephone set are carried as audible tones through the associated traffic channel. The 15 frames of the multiframe allocation scheme are thus necessary to carry the signalling information associated to all of the 30 user data time slots or traffic channels of these frames.

The common channel signalling (CCS) scheme also uses frames of 32 time slots of which one time slot is adapted to carry signalling information but this signalling information is here transported independently of the user data or traffic channel associated thereto.

The radio frequency line termination RFLT and the coaxial network terminations CNT map either the CAS or the CCS protocols into the time division multiple access (TDMA) multiframe structure used for the telephony transmission on the broadband cable link BCL. Each multiframe of this structure, transmitted at a radio frequency, is constituted by at least four frames which each comprises 40 time slots carrying bursts of data. A burst of data comprises a synchronization part and a payload wherein telephony data is loaded. The synchronization part consists of extra bits used for synchronization, error control, signalling and some guard bits to avoid burst overlaps.

Since the radio receiver line termination RFLT has only to synchronize once per burst, i.e. per time slot, the longer the burst, the better the channel usage and thus the transmission efficiency. On the other hand, the longer the burst, the larger the transmission delay due to the packetization of the data therein. However, the telephony loop delay may not exceed a predetermined value. A compromise has thus to be found as will be described below.

To carry Pulse Code Modulated (PCM) time slots, the payload of a TDMA burst must have a throughput of 64 Kbit/sec and must be composed of a multiple n of 8 bits, one byte being the length of a PCM time slot. To solve the above trade-off between the TDMA overhead and the loop delay, a burst has been chosen with a length of four bytes for its payload, i.e. with a value of four for the parameter n. Because each time slot only carries a burst of four telecommunication bytes, the polling delay is limited within international requirements and expensive echo cancellers are avoided. These four payload bytes of the burst are preceded by 6 extra synchronization bits in the synchronization part thereof. Moreover, each time slot of the multiframe carries either signalling information or user data but never a mixture of both, and a time slot carrying a signalling burst, i.e. a burst of signalling information, can only be associated to at most one time slot carrying a traffic burst, i.e. a burst of telephony user data.

Furthermore, in order to carry the above CAS and CCS schemes, a carrier must be able to carry simultaneously up to 30 "Public Office Telephone Service" (POTS) communications corresponding to the above 30 traffic channels. In other words, the number N of time slots per frame must be greater than or equal to 32 taking into account signalling transmission bandwidth. In the CAS protocols signalling information has a throughput of 16 Kbit/sec. The time slots are therefore grouped in blocks of five including four time slots carrying traffic bursts and one time slot carrying a signalling burst. As a result, a frame must have a number N of time slots which is a multiple of 5. In order to carry the 30 POTS communications with their signalling information, each frame comprises 40 time slots and four frames are necessary to carry the signalling information associated to the 30 traffic bursts per frame.

Figure 2:
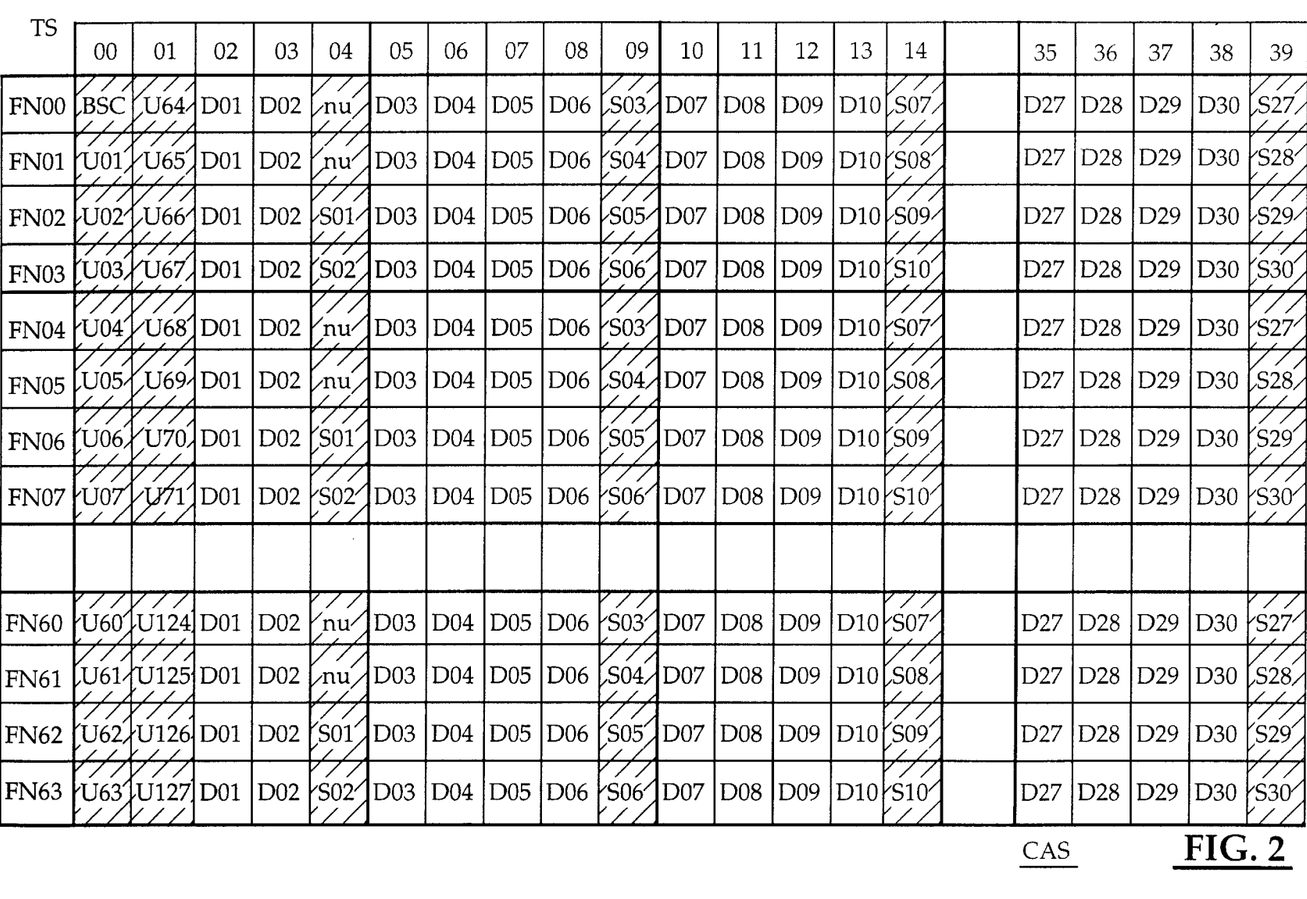
FIG. 2 represents frames of a multiframe structure used for transmitting channel associated signalling (CAS) protocols.

FIG. 2 shows several TDMA multiframes each constituted of four frames FN00–FN03, FN04–FN07, . . . , FN60–FN63 subdivided into 40 time slots TS00 to TS39. This multiframe structure is adapted to carry channel associated signalling (CAS) protocols.

In each frame FN00–FN63, 30 time slots TS02, TS03, TS05 to TS08, TS10 to TS13, . . . and TS35 to TS38 are adapted to carry traffic bursts, D01 to D30 respectively, of which the payload is constituted by four bytes of telephony user data, while 8 time slots TS04, TS09, TS14, . . . and TS39 are adapted to carry signalling bursts of which the payload is constituted by 32 bits of telephony signalling information. The remaining two time slots TS00 and TS01 carry control bursts of cable link operation signalling as will be explained later.

The above blocks of five time slots are distributed over the multiframe and are constituted by the time slots TS00 to TS04, TS05 to TS09, TS10 to TS14, . . . , TS35 to TS39. In each of these blocks, except the first one TS00 to TS04, the first four time slots carry traffic bursts of user data D03 to D06, D07 to D10, . . . and D27 to D30,while the last time slot carries a signalling burst. Since the signalling bursts are each only associated to one single traffic burst, the signalling information S03 to S30 respectively associated to the user data D03 to D30 forms part of the signalling bursts distributed over the four frames of the multiframe.

The first block of time slots TS00 to TS04 is slightly different in that its first two time slots TS00 and TS01 carry control bursts of cable link operation signalling and that the following two time slots TS02 and TS03 carry traffic bursts of the user data D01 and D02. The fifth time slot TS04 of the first block TS00 to TS04 is not used (nu) in the first two frames FN00 and FN01 of a multiframe, say FN00 to FN03 as an example, and carries signalling bursts S01 and S02 of signalling information associated to the traffic bursts D01 and D02 in the last two frames FN02 and FN03 of this multiframe FN00 to FN03. The 30 traffic channels and 30 signalling channels associated thereto of the channel associated signalling (CAS) protocols are thus mapped and transported in the multiframe structure of four frames, e.g. FN00 to FN03.

In this CAS implementation, the control bursts of cable link operation signalling mentioned above are carried by the time slots TS00 and TS01 of each frame. Cable link operation signalling may for instance be synchronization information or a "User Associated Channel" (UAC) number. Synchronization information, used to synchronize the multiframe, is loaded in the first time slot TS00 of the first frame FN00 of the multiframe structure and this time slot TS00 is called "Broadcast Synchronization Channel" (BSC). The user associated channel (UAC), loaded in the second time slot TS01 of the first frame FN00 of the multiframe structure as well as in the first two time slots TS00 and TS01 of all the other frames, is used to exchange information between the radio frequency line termination RFLT located in the telephony access node TAN and the coaxial network terminations CNT1, CNT2, . . . to CNTn. This exchange of information forms part of a multiframe handling protocol which will be explained below.

Each subscriber station HOME, and more particularly the coaxial network termination CNT thereof, has a unique address known by the radio frequency line termination RFLT. To establish a link with a particular coaxial network termination, say CNT1, the line termination RFLT loads the address of the corresponding destination subscriber station, say U01, as a user associated channel (UAC) number in one of the above time slots carrying control bursts, i.e. in the time slot TS01 of the first frame FN00 or in any of the first two time slots TS00 or TS01 of the following frames. Each coaxial network termination CNT is adapted to recognise its own unique address within these time slots. When the address U01 of the coaxial network termination CNT1 is recognised by the latter, e.g. in the control burst carried by the time slot TS00 of the second frame FN01, this time slot is memorised by CNT1 as dedicated thereto and will further always be used by the latter to exchange information with the radio frequency line termination RFLT and so further with the telephony access node TAN and the local telephone exchange LTE. The information exchanged through this dedicated time slot is for instance used for the allocation or de-allocation of time slots carrying traffic bursts D01, . . . , D30 with there associated signalling bursts S01, . . . , S30 via which the user associated to CNT1 may, owing to his telephone set, transmit and receive data to and from the local telephone exchange LTE or the video broadcasting head-end HE as mentioned above. This dedicated time slot may also be used by the telephony access node TAN to initiate and manage remote functions such as tests, configuration settings and resets, as well as by the coaxial network termination CNT to report status, alarms, etc . . .

Although the number of simultaneous telephone communications is limited to a maximum of 30 because of the 30 time slots carrying traffic bursts in a frame, the number of semi-permanent links established between the radio frequency line termination RFLT and the coaxial network terminations CNT via the broadband cable link BCL may be much higher when the multiframes are arranged in a super-multiframe structure. If, for instance as shown in FIG. 2, a super-multiframe structure including 18 multiframes or 64 frames FN00 to FN63 is build, it is possible, with only two time slots TS00 and TS01 per frame carrying control bursts, to access up to 127 subscriber stations HOME. The first time slot TS00 of the first frame FN00 is then reserved for carrying a control burst of super-multiframe synchronization, i.e. is a BSC channel, and all the other time slots carry control bursts which are used to exchange information with the 127 subscriber stations of which the coaxial network terminations CNT have addresses U01 to U127 as indicated. In such a super-multiframe structure the number of connected subscriber stations HOME is high, while the polling delay of the telephone communications remains very low owing to the only two time slots carrying control bursts in each frame.

Figure 3:
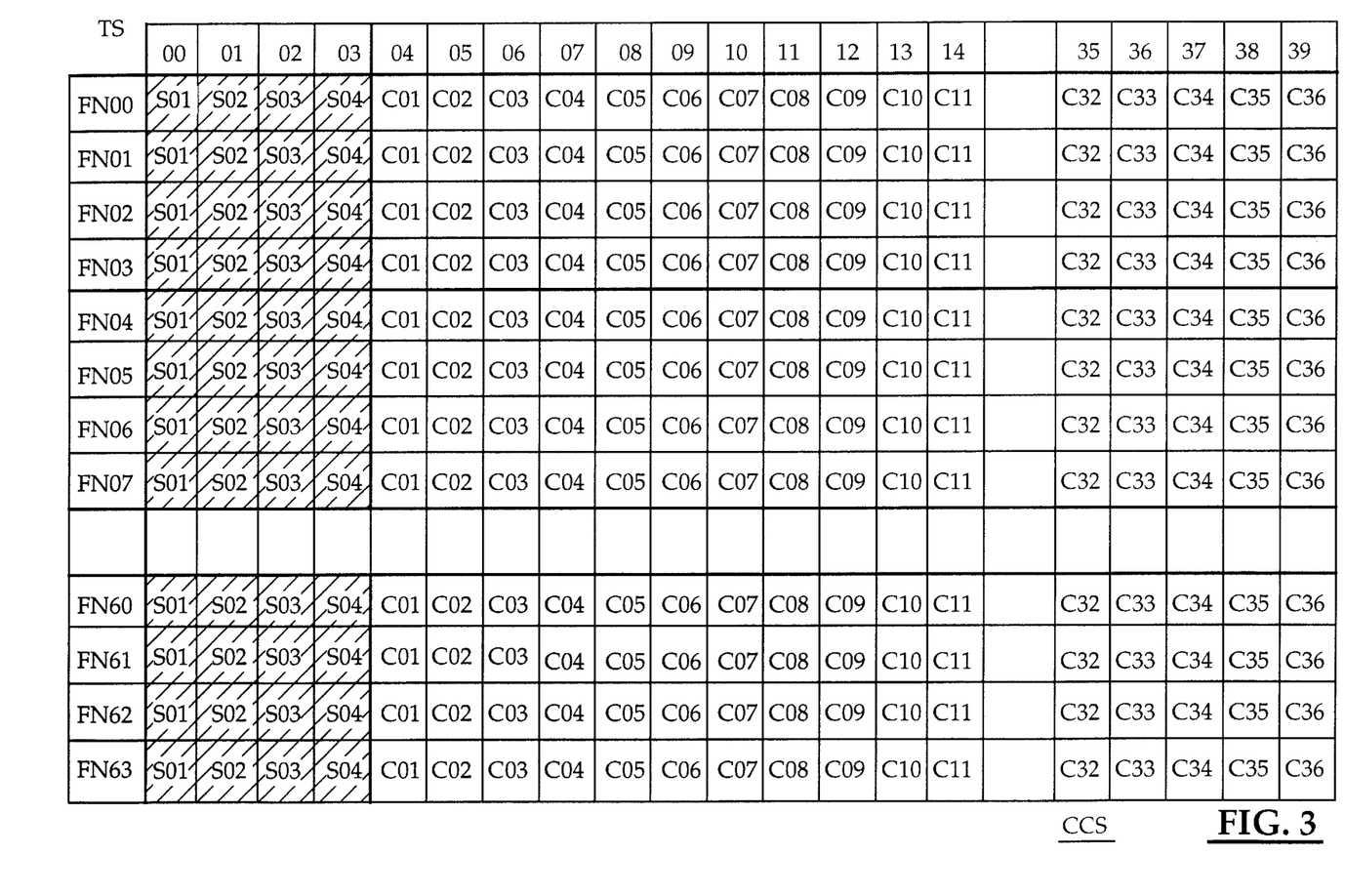
FIG. 3 represents a frame of a multiframe structure used for transmitting common channel signalling (CCS) protocols.

FIG. 3 shows a multiframe structure similar to the one of FIG. 2 but adapted to carry common channel signalling CCS protocols. In the CCS protocols, the user data carried by the 30 time slots or traffic channels as well as the data carried by the single signalling channel all have a sampling rate of 64 kbit/second. Since the signalling data is transmitted independently of the user data, an implementation has been designed to allow the transmission of up to 36 POTS communications or 32 ISDN channels. To this end, the first four time slots TS00 to TS03 of each frame are used to carry control bursts of cable link operating signalling and the following 36 time slots TS04 to TS39 carry traffic bursts C01 to C36 of telephony user data. In order to carry, for instance, the D channel of the ISDN protocol, each TDMA multiframe structure includes four frames FN00 to FN03, as for the CAS scheme. In each frame, the time slots TS00 to TS03 carry signalling bursts, S01 to S04 respectively, including cable link operating signalling that is merged with other frame signalling and synchronization information of the CCS protocols. These four consecutive signalling bursts form a group which can be seen as one large burst including the signalling messages from S01 to S04. A wideband common control channel TS00 to TS03 is so obtained.

For the above reasons of addressing a large number of subscriber stations HOME without increasing the polling delay by allocating more than two time slots per frame carrying control bursts, the multiframes are also arranged in a super-multiframe structure including 64 frames FN00 to FN63. In this super-multiframe structure, the addresses of the coaxial network terminations CNT are embedded in the common control channel TS00 to TS03 of all the frames FN00 to FN63.

While the principles of the invention have been described above in connection with specific apparatus, it is to be clearly understood that this description is made only by way of example and not as a limitation on the scope of the invention.

Thus, although the invention has been shown and described with respect to a best mode embodiment thereof, it should be understood by those skilled in the art that the foregoing and various other changes, omissions and additions in the form and detail thereof may be made therein without departing from the spirit and scope of the invention.

We claim:

1. Method for transmitting narrowband telephony signals in a multiframe structure according to a channel associated signalling (CAS) protocol or a common channel signalling (CCS) protocol over a broadband cable link (BCL) onto which broadband signals are transmitted, comprising the steps of:

forming said multiframe structure including a plurality of time division multiple access (TDMA) frames (FN00–FN03), each frame comprising a plurality of time slots (TS00–TS39) each time slot adapted to carry a burst of data, a first plurality of said time slots for carrying signalling bursts (S01–S30; S01–S04) of telephony signalling information and a second plurality of said time slots for carrying traffic bursts (D01–D30; C01–C36) of telephony traffic data, and for the common channel signalling (CCS) protocol grouping the time slots carrying said signalling bursts within each of said frames, or for the channel associated signalling (CAS) protocol, separating time slots carrying said signalling bursts by several time slots carrying said traffic bursts so that they are distributed over the frames of said multiframe structure on a periodic basis.

2. Method according to claim 1, further comprising the step of including within each of said frames (FN00–FN03) at least one time slot (TS00–TS01; TS00–TS03) for carrying a control burst of cable link operation signalling for exchange between a telephony access node (TAN) and subscriber stations (HOME) which are all coupled to said broadband cable link (BCL) onto which said broadband signals are frequency multiplexed with said narrowband telephony signals.

3. Method according to claim 1, further comprising the step of distributing the time slots of said multiframe structure (FN00–FN03) for said channel associated signalling (CAS) protocol at a rate of one time slot carrying a signalling burst for four time slots carrying traffic bursts.

4. Method according to claim 1, further comprising the step of, for said channel associated signalling (CAS) protocol, including in each of said frames (FN00–FN03) eight time slots (TS04, TS09, TS14, ..., TS39) for carrying signalling bursts and at least thirty time slots (TS02, TS03, TS05–TS08, TS10–TS13, ..., TS35–TS38) for carrying traffic bursts, each of said signalling bursts being associated to at most one of said traffic bursts.

5. Method according to claim 1, wherein each of said frames comprises forty time slots (TS00–TS39).

6. Method according to claim 1, wherein each of said bursts of data comprises a synchronization part and a payload, said synchronization part including guard bits, synchronization bits and error control bits and said payload including a plurality of bytes of said telephony signals.

7. Method according to claim 6, wherein said payload comprises four bytes of said telephony signals and wherein said multiframe structure includes at least four frames (FN00–FN03).

8. Method according to claim 1, wherein all said time slots (TS00–TS39) have a same length.

9. Telephone access node (TAN) for use in a broadband telecommunication network and adapted to handle narrowband telephony signals according to a channel associated signalling (CAS) protocol or a common channel signalling (CCS) protocol, said telephone access node (TAN) being coupled to a plurality of subscriber stations (HOME) via a broadband cable link (BCL) onto which broadband signals and said narrowband telephony signals are transmitted, wherein said telephone access node (TAN) includes line termination means (RFLT) adapted to map said narrowband signals according to one of said CAS protocol or said CCS protocol into a multiframe structure which is transmitted on said broadband cable link (BCL), said multiframe structure including a plurality of time division multiple access (TDMA) frames (FN00–FN03), each frame comprising a plurality of time slots (TS00–TS39) each time slot adapted to carry a burst of data, a first plurality of said time slots carrying signalling bursts (S01–S30; S01–S04) of telephony signalling information and a second plurality of said time slots carrying traffic bursts (D01–D30; C01–C36) of telephony traffic data, wherein for the common channel signalling (CCS) protocol said line termination means (RFLT) are adapted to group the time slots carrying said signalling bursts within each of said frames, and wherein for the channel associated signalling (CAS) protocol said line termination means (RFLT) are adapted to separate time slots carrying said signalling bursts by several time slots carrying said traffic bursts and to distribute said time slots carrying said signalling bursts over the frames of said multiframe structure on a periodic basis.

10. Telephone access node (TAN) according to claim 9, wherein each of said frames (FN00–FN03) of said multiframe structure includes at least one time slot (TS00–TS01; TS00–TS03) carrying a control burst, and wherein said line termination means (RFLT) are further adapted to load said one time slot with cable link operation signalling for exchange between said telephone access node (TAN) and said subscriber stations (HOME).

11. Subscriber station (HOME) for use in a broadband telecommunication network including a telephone access node (TAN) and adapted to handle narrowband telephony signals according to channel associated signalling (CAS) protocols or common channel signalling (CCS) protocols, said telephone access node (TAN) being coupled to a plurality of said subscriber stations (HOME) via a broadband cable link (BCL) onto which broadband signals and said narrowband telephony signals are transmitted, wherein said subscriber stations (HOME) includes network termination means (CNT) adapted to map said signalling protocols (CAS, CCS) into a multiframe structure which is transmitted on said broadband cable link (BCL), said multiframe structure including a plurality of time division multiple access (TDMA) frames (FN00–FN03), each frame comprising a plurality of time slots (TS00–TS39) each adapted to carry a burst of data, a first plurality of said time slots carrying signalling bursts (S01–S30; S01–S04) of telephony signalling information and a second plurality of said time slots carrying traffic bursts (D01–D30; C01–C36) of telephony traffic data, wherein for the common channel signaling (CCS) protocols said network termination means (CNT) are adapted to group the time slots carrying said signalling bursts within each of said frames, and wherein for the channel associated signalling (CAS) protocols said network termination means (CNT) are adapted to separate time slots carrying said signalling bursts by several time slots carrying said traffic bursts and to distribute said time slots carrying said signalling bursts over the frames of said multiframe structure on a periodic basis.

12. Subscriber station according to claim 11, wherein each of said frames (FN00–FN03) of said multiframe structure includes at least one time slot (TS00–TS01; TS00–TS03) carrying a control burst, and wherein said network termination means (CNT) are further adapted to load said one time slot with cable link operation signalling for exchange between said telephone access node (TAN) and said subscriber station (HOME).

13. Telephone access node (TAN) and subscriber station (HOME) according to claim 11, wherein said telephone access node is adapted to cooperate with said network termination means (CNT).

14. Method for handling a multiframe structure for transmitting narrowband telephony signals over a broadband cable link (BCL) comprising the steps of:
frequency multiplexing said narrowband telephony signals with broadband video signals, and
including in said multiframe structure a plurality of time division multiple access (TDMA) frames (FN00–FN63), each frame comprising a plurality of time slots for carrying telephony bursts of narrowband telephony data and at least one time slot (TS00–TS01; TS00–TS03) for carrying a control burst of cable link operation signalling for exchange between termination devices (RFLT, CNT) located at respective ends of said broadband cable link (BCL) and further comprising the steps of:
coupling a telephone access node (TAN) to a plurality of subscriber stations (HOME) with said broadband cable link, each of said subscriber stations having an unique address,
at the location of said telephone access node, loading one unique address into one of said time slots for carrying a control burst,
firstly recognizing said one unique address by the subscriber station having said one unique address, and secondly, subsequently using said one time slot on said broadband cable link (BCL) to carry control bursts of said cable link operation signalling exchanged between said telephone access node and said subscriber station having said one unique address.

15. Method according to claim 14, wherein in said multiframe structure (FN00–FN63) a number of time slots (TS00–TS01; TS00–TS03) carrying control bursts is higher than an equivalent number of time slots for carrying individual telephone communications (D01–D30; C01–C36) simultaneously established over said broadband cable link (BCL) between said telephone access node (TAN) and said subscriber stations (HOME).

16. Telephone access node (TAN) for use in a broadband telecommunication network and adapted to handle narrowband telephony signals, said telephone access node (TAN) including a broadband cable link port for coupling to a plurality of subscriber stations (HOME) via a broadband cable link (BCL) onto which broadband signals and said narrowband telephony signals are transmitted, wherein said telephony signals are for transmission on said broadband cable link (BCL) according to a time division multiple access (TDMA) multiframe structure, said multiframe structure including a plurality of frames (FN00–FN63), each frame including a plurality of time slots (TS00–TS39) each carrying a burst of data, and wherein said telephone access node (TAN) includes line termination means (RFLT) adapted to load in at least one of said time slots (TS00–TS01; TS00–TS03) a control burst of cable link operation signalling for exchange between said telephone access node (TAN) and said subscriber stations (HOME) wherein each of said subscriber stations (HOME) has an unique address and wherein said line termination means (RFLT) are adapted to firstly load said unique address into one of said time slots carrying a control burst and to secondly and subsequently use said one time slot for further exchange of cable link operation signalling between said telephone access node and the subscriber station having said unique address.

17. Telephone access node (TAN) and subscriber station (HOME) according to claim 16, wherein said line termination means (RFLT) are adapted to cooperate with a network termination means (CNT) of said subscriber station (HOME) for handling said multiframe structure.

18. Telephone access node (TAN) according to claim 16, wherein said telephone access node is adapted to handle a multiframe handling protocol according to common channel signalling (CCS) or channel associated signalling (CAS).

19. Telephone access node (TAN) according to claim 17, wherein said line termination means (RFLT) are adapted to handle said multiframe structure.

20. Subscriber station (HOME) for use in a broadband telecommunication network including a telephone access node (TAN) and adapted to handle narrowband telephony signals, said telephone access node (TAN) being coupled to a plurality of subscriber stations (HOME) via a broadband cable link (BCL) onto which broadband signals and said narrowband telephony signals are transmitted, wherein said telephony signals are transmission on said broadband cable link (BCL) according to a time division multiple access (TDMA) multiframe structure, said multiframe structure including a plurality of frames (FN00–FN63), each frame including a plurality of time slots (TS00–TS39) each carrying a burst of data, and wherein each of said subscriber stations (HOME) includes network termination means (CNT) adapted to load in at least one of said time slots (TS00–TS01; TS00–TS03) a control burst of cable link operation signalling for exchange between said telephone access node (TAN) and said subscriber station (HOME) wherein said subscriber station (HOME) has an unique address and wherein said network termination means (CNT) are adapted to recognize said unique address in one of said time slots carrying a control burst and to then only use said one time slot for further exchange of cable link operation signalling between said telephone access node (TAN) and said subscriber station.

21. Subscriber station (HOME) according to claim 20, wherein said network termination means (CNT) are adapted to handle said multiframe structure according to common channel signalling (CCS) or channel associated signalling (CAS).

22. Subscriber station (HOME) according to claim 20, wherein said telephone access node (TAN) is adapted to cooperate with said network termination means (CNT) of said subscriber station (HOME).

23. Subscriber station (HOME) according to claim 20, wherein said network termination means (CNT) are adapted to handle said multiframe structure.

24. Broadband telecommunication network including transmitter means (TAN/HOME) and receiver means (HOME/TAN) both adapted to handle narrowband telephony signals in a multiframe structure according to channel associated signaling (CAS) protocols or common channel signaling (CCS) protocols, said transmitter means being coupled to said receiver means via a broadband cable link (BCL) onto which broadband signals and said narrowband telephony signals are transmitted, wherein said transmitter means (TAN/HOME) includes termination means (RFLT/CNT) adapted to map data of said signaling protocols (CAS, CCS) into said multiframe structure that is transmitted on said broadband cable link (BCL), said multiframe structure including a plurality of time division multiple access (TDMA) frames (FN00–FN03), each frame comprising a plurality of time slots (TS00–TS39) each time slot being adapted to carry a burst of data, a first plurality of said time slots carrying signaling bursts (S01–S30; S01–S04) of telephony signaling information and a second plurality of said time slots carrying traffic bursts (D01–D30; C01–C36) of telephony traffic data, wherein for the common channel signaling (CCS) protocols said termination means (RFLT/CNT) are adapted to group the time slots carrying said signaling bursts within each of said frames, and wherein for the channel associated signaling (CAS) protocols said termination means (RFLT/CNT) are adapted to separate time slots carrying said signaling bursts by several time slots carrying said traffic bursts and to distribute said time slots carrying said signaling bursts over the frames of said multiframe structure on a periodic basis.

25. Broadband telecommunication network according to claim 24, wherein each of said frames (FN00–FN03) of said multiframe structure includes at least one time slot (TS00–TS01; TS00–TS03) carrying a control burst, and wherein said termination means (RFLT/CNT) are further adapted to load said one time slot with cable link operation signaling for exchange between said transmitter means (TAN/HOME) and said receiver means (HOME/TAN).

26. Broadband telecommunication network according to claim 24, wherein for said channel associated signaling (CAS) protocol, said termination means (RFLT/CNT) is adapted to distribute the time slots in said multiframe structure (FN00–FN03) at a rate of one time slot carrying a signaling burst for four time slots carrying traffic bursts.

27. Broadband telecommunication network according to claim 24, wherein for said channel associated signaling (CAS) protocol, said termination means (RFLT/CNT) is adapted to include in each of said frames (FN00–FN03) eight time slots (TS04, TS09, TS14, . . . , TS39) carrying signaling bursts and at least thirty time slots (TS02, TS03, TS05–TS08, TS10–TS13, . . . , TS35–TS38) carrying traffic bursts, and to associate each of said signaling bursts to at most one of said traffic bursts.

28. Broadband telecommunication network according to claim 24, wherein each of said frames comprises forty time slots (TS00–TS39).

29. Broadband telecommunication network according to claim 24, wherein each of said bursts of data comprises a synchronization part and a payload, and wherein said termination means (RFLT/CNT) is adapted to include guard bits, synchronization bits and error control bits into said synchronization part, and to include a plurality of bytes of said telephony signals into said payload.

30. Broadband telecommunication network according to claim 29, wherein said payload comprises four bytes of said telephony signals and wherein said multiframe structure includes at least four frames (FN00–FN03).

31. Broadband telecommunication network according to claim 24, wherein all said time slots (TS00–TS39) have a same length.

32. Telephone access node (TAN) for use in a broadband telecommunication network and adapted to handle narrowband telephony signals according to channel associated signaling (CAS) protocols or common channel signaling (CCS) protocols, said telephone access node (TAN) being coupled to a plurality of subscriber stations (HOME) via a broadband cable link (BCL) onto which broadband signals and said narrowband telephony signals are transmitted, wherein said telephone access node (TAN) includes a port for linking said telephone access node to said broadband cable link, and wherein said telephone access node further includes line termination means (RFLT) adapted to map data of said signaling protocols (CAS, CCS) into a multiframe structure which is transmitted on said broadband cable link (BCL), said multiframe structure including a plurality of time division multiple access (TDMA) frames (FN00–FN03), each frame comprising a plurality of time slots (TS00–TS39) each time slot being adapted to carry a burst of data, a first plurality of said time slots carrying signaling bursts (S01–S30; S01–S04) of telephony signaling information and a second plurality of said time slots carrying traffic bursts (D01–D30; C01–C36) of telephony traffic data, wherein for the common channel signaling (CCS) protocols said line termination means (RFLT) are adapted to group the time slots carrying said signaling bursts within each of said frames, and wherein for the channel associated signaling (CAS) protocols said line termination means (RFLT) are adapted to separate time slots carrying said signaling bursts by several time slots carrying said traffic bursts and to distribute said time slots carrying said signaling bursts over the frames of said multiframe structure on a periodic basis.

33. Telephone access node (TAN) according to claim 32, wherein each of said frames (FN00–FN03) of said multiframe structure includes at least one time slot (TS00–TS01; TS00–TS03) carrying a control burst, and wherein said line termination means (RFLT) are further adapted to load said one time slot with cable link operation signaling for exchange between said telephone access node (TAN) and said subscriber stations (HOME).

34. Telephone access node (TAN) and subscriber station (HOME) according to claim 32, wherein said line termination means (RFLT) are adapted to cooperate with network termination means (CNT) of said subscriber station (HOME).

35. Subscriber station (HOME) for use in a broadband telecommunication network including a telephone access node (TAN) and adapted to handle narrowband telephony signals according to a channel associated signaling (CAS) protocol or a common channel signaling (CCS) protocol, said telephone access node (TAN) for coupling to a plurality of subscriber stations (HOME) via a broadband cable link (BCL) onto which broadband signals and said narrowband telephony signals are transmitted, wherein said subscriber station (HOME) includes a broadband cable link port for connection to said broadband cable link and network termination means (CNT) adapted to map data of said channel associated signaling protocol (CAS) or said common channel signaling protocol (CCS) into a multiframe structure which is transmitted on said broadband cable link (BCL) via said port, said multiframe structure including a plurality of time division multiple access (TDMA) frames (FN00–FN03), each frame comprising a plurality of time slots (TS00–TS39) each time slot being adapted to carry a burst of data, a first plurality of said time slots carrying signaling bursts (S01–S30; S01–S04) of telephony signaling information and a second plurality of said time slots carrying traffic bursts (D01–D30; C01–C36) of telephony traffic data, wherein for the common channel signaling (CCS) protocol said network termination means (CNT) are adapted to group the time slots carrying said signaling bursts within each of said frames, and wherein for the channel associated signaling (CAS) protocol said network termination means (CNT) are adapted to separate time slots carrying said signaling bursts by several time slots carrying said traffic bursts and to distribute said time slots carrying said signaling bursts over the frames of said multiframe structure on a periodic basis.

36. Subscriber station according to claim 35, wherein each of said frames (FN00–FN03) of said multiframe structure includes at least one time slot (TS00–TS01; TS00–TS03) carrying a control burst, and wherein said network termination means (CNT) are further adapted to load said one time slot with cable link operation signaling for exchange between said telephone access node (TAN) and said subscriber station (HOME).

37. Method for handling a multiframe structure used for transmitting narrowband telephony signals over a broadband cable link (BCL) coupling a telephone access node (TAN) to a plurality of subscriber stations (HOME), each of said subscriber stations having an unique address, wherein said multiframe structure includes a plurality of time division multiple access (TDMA) frames (FN00–FN63), each frame comprising a plurality of time slots, said method including:

steps of frequency multiplexing said narrowband telephony signals with broadband video signals onto said broadband cable link (BCL), steps of loading telephony bursts of narrowband telephony data into a plurality of time slots of each of said frames, and of loading a control burst of cable link operation signaling for exchange between said telephone access node (TAN) and said subscriber stations (HOME) into at least one time slot (TS00–TS01; TS00–TS03) of each of said frames, a first preliminary step of loading, as a first control burst, one unique address into said one time slot at the location of said telephone access node (TAN), a second preliminary step of recognizing, into said one time slot, said one unique address by the subscriber station having said one unique address, and steps, following said first and second preliminary steps, of then using only said one time slot on said broadband cable link (BCL) to load therein and to unload therefrom control bursts of said cable link operation signaling exchanged between said telephone access node and said subscriber station having said one unique address.

38. Method according to claim 37, wherein in said multiframe structure (FN00–FN63) a number of time slots (TS00–TS01; TS00–TS03) carrying control bursts is higher than an equivalent number of telephone communications (D01–D30; C01–C36) able to be simultaneously established over said broadband cable link (BCL) between said telephone access node (TAN) and said subscriber stations (HOME).

39. Telephone access node (TAN) for use in a broadband telecommunication network and adapted to handle narrowband telephony signals, said telephone access node (TAN) having a port for coupling to a plurality of subscriber stations (HOME) via a broadband cable link (BCL) onto which broadband signals and said narrowband telephony signals are transmitted, wherein said telephony signals are transmitted on said broadband cable link (BCL) according to a time division multiple access (TDMA) multiframe structure, said multiframe structure including a plurality of frames (FN00–FN63), each frame including a plurality of time slots (TS00–TS39) each time slot carrying a burst of data, wherein said telephone access node (TAN) includes line termination means (RFLT) adapted to load into at least one time slot (TS00–TS01; TS00–TS03) a control burst of cable link operation signaling for exchange between said telephone access node (TAN) and said subscriber stations (HOME), wherein each of said subscriber stations (HOME) has an unique address, and wherein said line termination means (RFLT) are further adapted to load said unique address, as a first control burst, into said one time slot and to afterwards only use said one time slot for further exchange of cable link operation signaling between said telephone access node and the subscriber station having said unique address.

40. Telecommunications network comprising:

means for transmitting broadband signals to a plurality of subscriber stations from a broadband headend over a link and means for transmitting narrowband signals over said link between said plurality of subscriber stations and both said broadband headend and a local telephone exchange by frequency division multiplexing between said broadband signals and said narrowband signals and wherein said narrowband signals are organized according to a time division multiple access protocol in a multiframe structure having plural frames, each frame having both signaling information time slots and traffic information time slots and having a frame structure permitting either grouping of signaling time slots independently of said traffic information time slots according to a common channel signaling (CCS) protocol or distributing the signaling time slots among the traffic information time slots according to a channel associated signaling protocol (CAS).

41. Telecommunications network of claim 40, wherein said frame comprises forty time slots.

* * * * *

UNITED STATES PATENT AND TRADEMARK OFFICE
CERTIFICATE OF CORRECTION

PATENT NO : 5,848,070
DATED : December 8, 1998
INVENTOR(S): Marc Marie Gishlain Durvaux et al It is certified that error appears in the above-identified patent and that said Letters Patent is hereby corrected as shown below:

At column 10, line 54 (claim 1, line 16), after "protocol", insert --,--.

Signed and Sealed this

Thirtieth Day of March, 1999

Attest:

Attesting Officer

Q. TODD DICKINSON

Acting Commissioner of Patents and Trademarks